United States Patent [19]
Eckart

[11] Patent Number: 5,601,074
[45] Date of Patent: Feb. 11, 1997

[54] AUTOMATIC SOLAR HEATING SYSTEM

[76] Inventor: Erich G. Eckart, Öttingenstrasse 54, D-80538 Munich, Germany

[21] Appl. No.: 420,866

[22] Filed: Apr. 12, 1995

[30] Foreign Application Priority Data

Apr. 22, 1994 [DE] Germany .................. 44 14 111.4

[51] Int. Cl.$^6$ ........................................... F24J 2/42
[52] U.S. Cl. .................. 126/561; 4/493; 126/567; 126/640
[58] Field of Search ............... 126/561, 562, 126/563, 567, 640, 674, 676; 4/493

[56] References Cited

U.S. PATENT DOCUMENTS

| | | | |
|---|---|---|---|
| 3,991,742 | 11/1976 | Gerber | 126/563 |
| 4,085,728 | 4/1978 | Tomchak | 4/493 X |
| 4,333,186 | 6/1982 | Lankheet | 126/561 X |
| 4,406,278 | 9/1983 | Demmer | 126/563 |

FOREIGN PATENT DOCUMENTS

| | | | |
|---|---|---|---|
| 2432597 | 4/1980 | France | 4/493 |
| 2446366 | 9/1980 | France | 4/493 |
| 1328372 | 8/1973 | United Kingdom | 126/561 |

*Primary Examiner*—Carl D. Price
*Attorney, Agent, or Firm*—Wolf, Greenfield & Sacks, P.C.

[57] ABSTRACT

The invention relates to an automatic solar heating system for open-air swimming pools with a basin (2) for holding the bathing water, including a solar heating means with a walkable basin boundary (4, 22) incorporating a circulation path and having an inlet (6) for bathing water to be heated arranged beneath the level of the bathing water and an outlet (8) for heated bathing water, and a heat-insulated, evacuatable warm water tank (10) for the heated bathing water, the inlet (12) of the warm water tank (10) being arranged beneath the level of the outlet (8) of the basin boundary (4, 22) and connected with this outlet (8), and the outlet (14) of the warm water tank (10) being in communication via a pump-filter unit (16) with a basin inlet opening (18) for the heated and filtered bathing water.

19 Claims, 2 Drawing Sheets

AUTOMATIC SOLAR HEATING SYSTEM

BACKGROUND OF THE INVENTION

1. Field of the Invention

The present invention relates to an automatic solar heating system for open-air swimming pools with a basin for holding the bathing water.

2. Description of the Prior Art

Open-air swimming pools in only very few regions of the world reach bathing water temperatures which, without additional heating, guarantee real bathing pleasure.

As a rule, agreeable water temperatures can only be achieved with additional heating. However, the additional heating costs for this are considerable. The commonly applied heating method for producing warm water is by way of a gas or oil heater. In addition to the actual installation costs for such a heating system, considerable operation costs are also incurred on account of the expensive fuel in the form of oil or gas. The number of built private or public open-air swimming pools has decreased in the last twenty years.

In order to reduce the energy costs, so-called solar systems have been offered as alternatives. This relates to tubular systems laid out in a serpentine form and pressed into mats through which the bathing water taken from the open-air swimming pool is fed by means of a separate pump, heated by the sun and led back into the open-air swimming pool. The tubular systems are suitably arranged in a position especially exposed to the sun. Therefore, the tubular systems are usually arranged on the roof of a house, preferably an inclined roof and, as a rule, the orientation to the sun is in the south-west position in the northern hemisphere of the earth. The tubular systems can also be mounted in frames. A laying out of the tubular system is generally also possible on the ground surrounding the open-air swimming pool, for example in a garden.

However, such solar systems involve considerable disadvantages. Tubular systems arranged on roofs are only orientated in one direction to the sun and can not be made to follow the bath of the sun. A favourable solar irradiation angle can therefore only be realized in a very limited range of the path of the sun, on account of which a small coefficient of efficiency and thus a poor utilisation of the available solar energy results. Additionally, the daily duration of use of this solar system is greatly reduced on account of the above-described circumstances. Although apparatus for following the path of the sun are known in solar units, the costs of such devices are so high that their future use is initially limited only to solar systems in research.

As the tubular systems are positioned on inclined roofs or frames set up at an angle to achieve a favourable sunshine irradiation angle, the heating performance of the tubular system is reduced on account of cooling through the influences of wind. The solar tubular system additionally requires a separate pump in order to maintain the heating circulation and therefore consumes additional energy. The greater the level difference to be overcome between the water level of the open-air swimming pool, usually located on flat ground, and the tubular system arranged on the roof the higher the energy requirement. Additionally, the hose-like tubular systems mounted on the roof or laid out in the garden present an optically very unaesthetic view so that this version of the solar heating system only finds very low acceptance amongst open-air swimming pool owners.

SUMMARY OF THE INVENTION

The invention is therefore based on the technical problem of providing a solar heating system for open-air swimming pools which allows a heating of the bathing water in a simple and effective manner while saving considerable energy costs and may be additionally easily integrated into an open-air swimming pool concept.

This object is solved by an automatic solar heating system for open-air swimming pools with a basin for holding the bathing water, including a solar heating means with a walkable basin boundary incorporating a circulating path and having an inlet for bathing water to be heated arranged beneath the level of the bathing water and an outlet for heated bathing water, and a heat-insulated, evacuatable warm water tank for the heated bathing water, the inlet of the warm water tank being located beneath the level of the outlet of the swimming pool boundary and connected with this outlet and the outlet of the warm water tank being in communication via a pump-filter unit with a basin inlet opening for the heated and filtered bathing-water.

Following a one-off suctioning of the bathing water by means of the pump-filter unit, the solar heating system according to the invention operates completely automatically and does not require any further attention. In comparison to conventional heating or solar heating systems, the production of the heated water is not subject to any continuous running costs. The transport of the heated water out of the warm water tank into the basin ensues via the pump-filter unit, but the latter is necessary in any case to clean and circulate the bathing water. The filtering time required for the bathing water is not increased by the inventive solar heating means. In contrast to gas or oil heaters as well as conventional solar heating systems, warm bathing water can therefore by produced very cheaply. Additionally, the solar heating system according to the invention can be integrated into the overall concept of an open-air swimming pool in an elegant and space-saving manner as a walkable basin boundary. In contrast to solar heating systems arranged on inclined roofs according to the state of the art, the solar heating system according to the invention is in most cases also exposed for a longer period to solar radiation so that a greater utilisation ratio can be achieved.

It has proved to be advantageous to arrange the circulation path of the inventive solar heating system in a meander-shaped form because the effective circulation path is increased and the heating properties are improved in this manner.

The inventive solar heating system can be realized in a particularly advantageous manner when the basin boundary including the circulation path consists of a plurality of connectable heating modules. In this way, the solar heating system can be adapted to a plurality of basin shapes. The solar heating system can be extended as desired and the heating capacity increased by the addition of further heating modules. Already existing open-air swimming pools can also be easily reequipped with the inventive heating modules.

The heating modules are usually provided with a connecting means to connect several such heating modules and their circulating paths.

It has proved to be particularly useful when the heating modules are designed to be substantially plate-shaped. In this manner, a particularly simple production and simple adaptation of the heating modules to different basin shapes can be realized.

If the surface of the basin boundary exposed to the solar irradiation is provided with a structure which increases this surface, the efficiency of the heating module can be increased in an advantageous manner. In particular, hemispherical nobs, ribs or other suitable elevations or structural patterns are suitable as the structure.

Additionally, it has proved to be advantageous that the surface of the basin boundary exposed to the solar irradiation is coloured black since the efficiency of the solar heating system according to the invention can be increased in this way.

It is advantageous for the production of the inventive solar heating system that the basin boundary is made from plastic. A suitable plastic is substantially weather-proof and water-proof and UV-resistant.

If the basin boundary is designed to be inclined towards the basin edge, splashed water or water sloshing out of the basin can be easily returned into the basin.

In connection with this last-mentioned embodiment of the basin boundary, particularly rib- or wave-shaped structures are suitable as the structure for increasing the surface of the basin boundary exposed to the solar irradiation, the longitudinal direction of the ribs usefully being orientated in the direction of the basin.

In an advantageous embodiment, the inventive warm water tank is arranged separately of the basin. This embodiment is particularly suitable for already existing open-air swimming pools which are reequipped with the inventive solar heating system.

For producing new open-air swimming pool basins, however, it can be of advantage that the warm water tank is an integral part of the basin body. On account of this measure, the installation of the inventive solar heating system can be simplified and built-in basin parts such as a stairway or step can be formed together with the warm water tank.

In order to guarantee an inventive mode of operation of the solar heating system, it is necessary that the warm water tank is provided with a ventilation means. In this case, it is of advantage that the ventilation means is a ventilation valve. In order to install the circulation flow through the circulation path of the solar heating system according to the invention, it is necessary that the warm water tank can be evacuated so that the bathing water can once be sucked out of the basin by means of the pump-filter unit and supplied to the warm water tank. As soon as the heated bathing water flows into the warm water tank, the pump-filter unit is no longer necessary to maintain this process since, according to the principle of a suction lifter, gravitational force alone then suffices for this purpose. When the pump-filter unit is switched off, however, beyond a certain filling level in the heated water container, a counter-pressure can occur which is sufficient to interrupt the flow process that is maintained by the surrounding pressure of the open-air swimming pool. For this reason, a ventilation valve is provided which opens when a predetermined warm water tank inner pressure occurs and thus permits a supply of air and the maintaining of the in-flow process in the warm water tank. However, it is equally possible to simply design the ventilation valve in such a manner that it closes during the suction process by means of the pump-filter unit so long as heated bathing water is sucked out of the heating modules and flows into the warm water tank, on account of which the flow process is automatically maintained, as described above. When the pump is switched off, the ventilation valve automatically opens again.

In a further embodiment of the solar heating system according to the invention, it is additionally provided for that the outlet of the warm water tank has a return valve and is connected with an outlet of the basin. Usually, the bathing water of an open-air swimming pool is supplied to the pump-filter unit via an outlet arranged in the bottom area of the basin. Since the heated bathing water is also supplied to the pump-filter unit from the warm water tank in the solar heating system according to the invention, it is possible to supply the heated bathing water from the warm water tank and the water from the basin via a common line to the pump-filter unit. In order to prevent a back-flow of bathing water out of the outlet of the basin into the warm water tank when the pump-filter unit is switched off, a return valve is provided at the outlet of the warm water tank. Equally, however, a return valve can be provided at the outlet of the basin.

In order to prevent heat loss, the warm water tank is usefully heat-insulated.

BRIEF DESCRIPTION OF THE DRAWINGS

An embodiment of the invention is described in the following by way of further details and advantageous further embodiments in the drawings, in which.

DETAILED DESCRIPTION OF THE INVENTION

Figure 1:
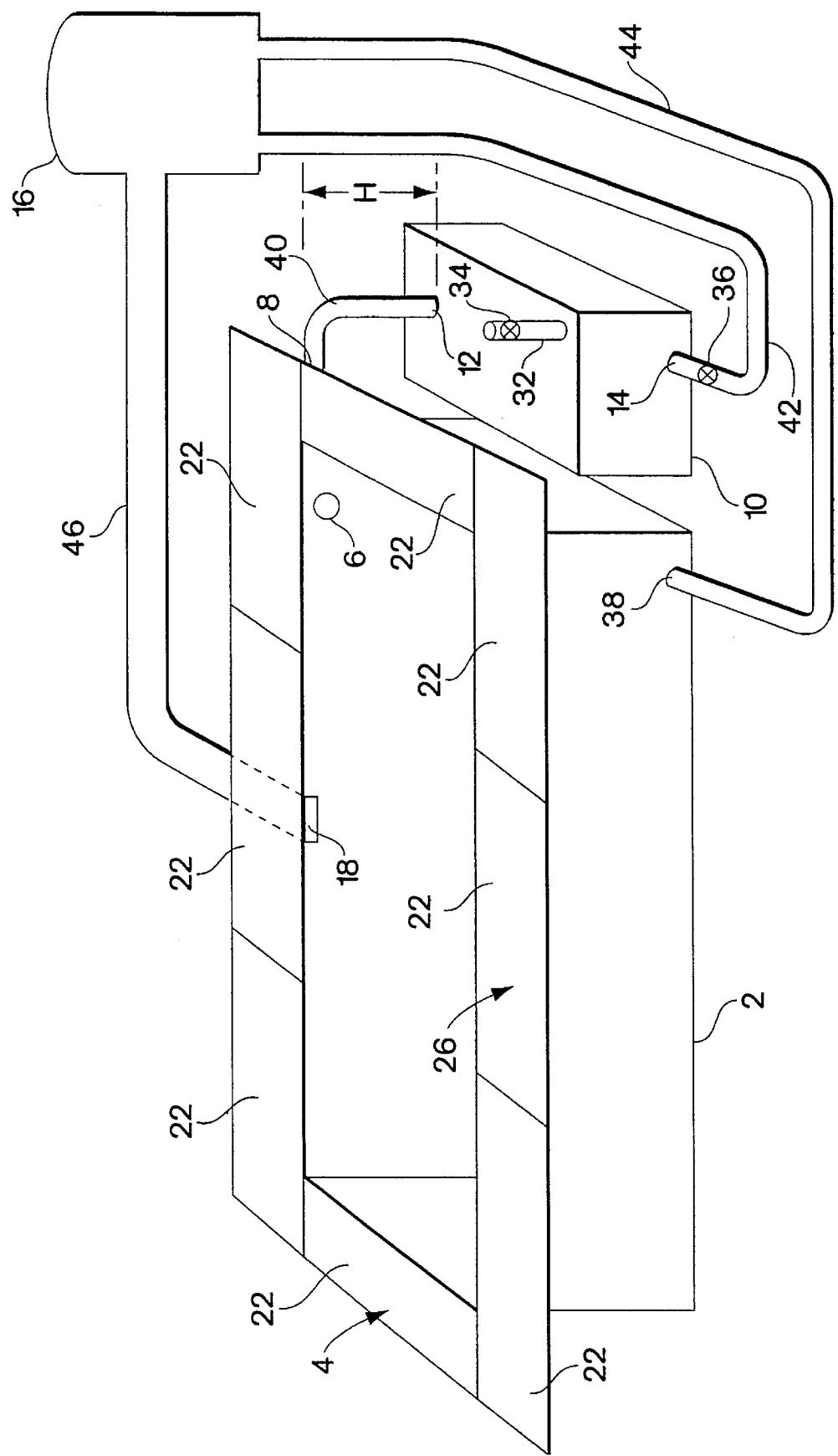
FIG. 1 shows a schematic perspective illustration of the automatic solar heating system according to the invention.

As shown in FIG. 1, the automatic solar heating system according to the invention is arranged in an open-air swimming pool with a rectangular basin 2 for holding the bathing water. The bathing water itself is not illustrated in the drawings. The solar heating means of the inventive solar heating system consists of a walkable basin boundary 4 which surrounds the edge of the basin 2 at all four sides. The basin boundary 4 includes a circulation path for the bathing water drawn from the basin. This circulation path will be described in more detail in the following. The basin boundary 4 additionally has an inlet 6 for the bathing water to be heated arranged beneath the level of the bathing water and an outlet 8 for the heated bathing water. The filling level of the basin which prevails during normal bathing activity is to be understood as the level of the bathing water.

The solar heating system according to the invention additionally includes an evacuatable warm water tank 10 for the heated bathing water which, in the present case, is arranged separately outside the basin 2, as illustrated in FIG. 1. The volume of the warm water tank 10 corresponds in the present case approximately to one tenth of the capacity of the basin 2. However, the volume of the warm water tank 10 can be varied according to use. The inlet 12 of the warm water tank 10 is located below the level of the outlet 8 of the basin boundary 4 and is connected to this outlet 8 via a line 40. The difference in height between the outlet 8 of the basin boundary 4 and the inlet 12 of the warm water tank 10 is denoted in FIG. 1 with the reference sign H. The outlet 14 of the warm water tank 2 itself is in communication via a pump-filter unit 16 with a basin inlet opening 18 for the heated and filtered bathing water. The connection between the outlet 14 of the warm water tank 10 and the pump-filter unit 16 is realized in this case by the line 42 and the connection between the pump-filter unit 16 and the basin inlet opening 18 by the line 46.

The basin 2 has a basin outlet 38 arranged in the bottom region of the basin 2 which is also connected to the pump-filter unit 16 by the separate line 44.

In order to prevent a back-flow of the heated bathing water through the line 42 into the warm water tank 10 when the pump-filter unit 16 is switched off, a return valve 36 is arranged at the outlet 14 of the warm water tank 10. However, the return valve 36 can equally be arranged in the line 42 or at a position of the pump-filter unit 16 connected with the line 42 or the outlet 14, but it can also be omitted if the filter unit is arranged higher than the water level in the basin.

In a further embodiment variation of the solar heating system according to the invention, it is also possible to join the line 44 to the line 40 so that only a single line 42 leads to the pump-filter unit 16. This embodiment is not shown in the drawings.

The warm water tank 10 is provided with a ventilation means 32 which in the present case consist of a vertically arranged pipe, the upper opening of which lies above the level of the bathing water in the basin 2. The ventilation means 32 is additionally provided with a ventilation valve 34 which closes as soon as the pressure within the warm water tank 10 is lower than the atmospheric ambient pressure of the basin 2 or the pressure in the basin boundary 4 connected to the basin.

To prevent heat-loss, the warm water tank 10 is heat-insulated.

As indicated in FIG. 1, the basin boundary 4 of the solar heating system according to the invention consists of a plurality of connected heating modules 22. The heating modules 22 are connected with each other and, in this manner, their respective circulation paths form the above-mentioned circulation path of the basin boundary 4. The basic outer form of the heating modules 22 is rectangular so that the basin boundary of the, in this case, rectangular basin 2 may be easily followed. In the case of open-air swimming pools with other basin shapes, the inventive heating modules 22 can also have other suitable basic shapes.

Figure 2:
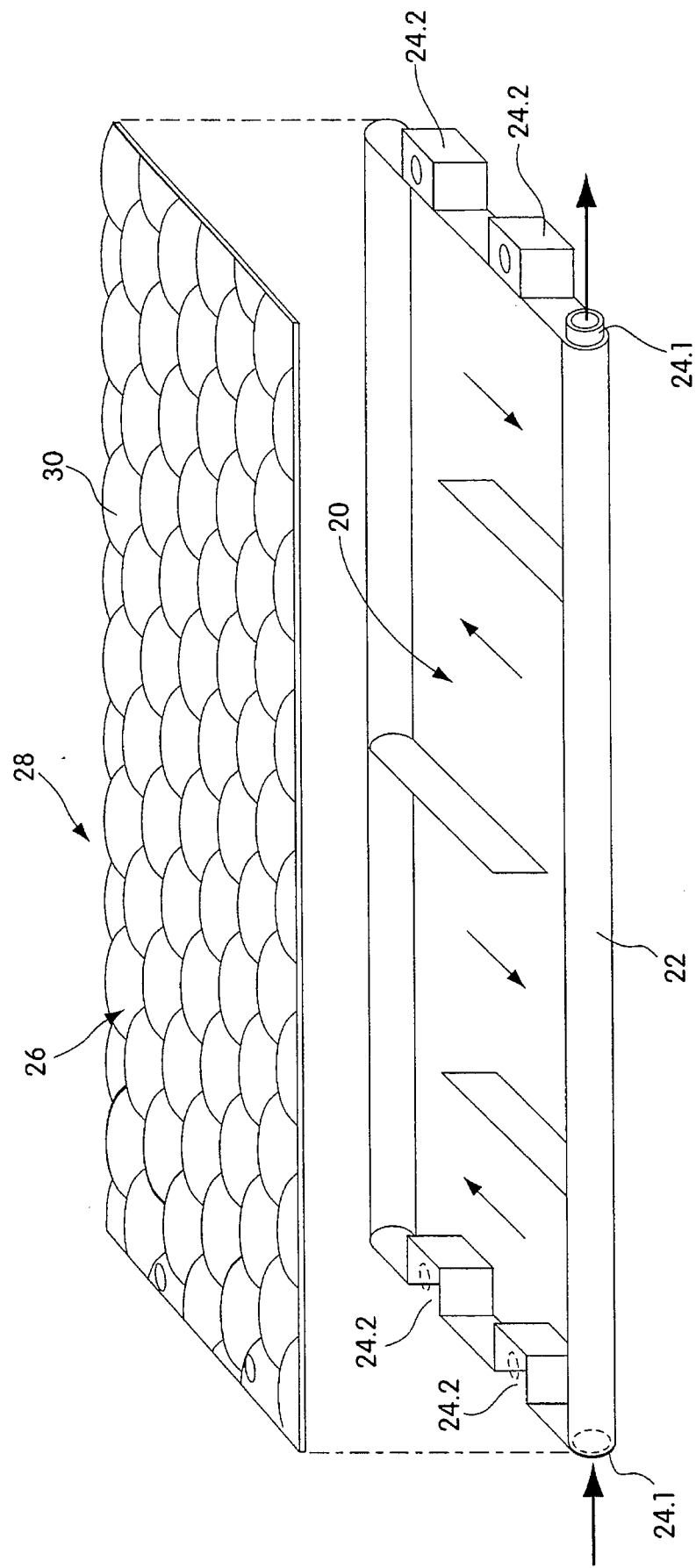
FIG. 2 shows a schematic enlarged view of an inventive heating module of the solar heating system.

In FIGS. 1 and 2, reference sign 26 denotes the surface of the basin boundary 4 or of the heating modules 22 forming the basin boundary 4 which are exposed to the solar irradiation.

A heating module 22 according to the invention is illustrated in more detail in FIG. 2 in a perspective enlarged view. The heating module 22 is designed to have a substantially plate-like shape. As may be easily recognized in FIG. 2, the internal circulation path 20 of the heating module 22 is meander-shaped. The flow direction within the circulation path 20 is indicated by arrows. The ribs of the heating module 22 which form the meander-shaped circulation paths simultaneously contribute to the impact strength of the walkable heating module 22. The heating module 22 is provided with a connecting means 24.1, 24.2 to connect several such heating modules 22 and their circulation paths 20. Here, reference sign 24.1 denotes the connecting means for the water connection and the reference sign 24.2 the connecting means for the purely mechanical coupling together of two or more such heating modules 22. The connecting means 24.1 can be provided with sealing elements or the like. These sealing elements are not illustrated in the figures. The connecting means 24.2 can be a socket, slide or snap-connector or any other suitable connecting elements. The connecting means 24.1 and 24.2 can also be integrated in a single connecting element.

As may also be recognized in FIG. 2, the surface 26 of the heating modules 22 exposed to the solar irradiation may be provided with a structure 28 which increases the surface 26. In the present case, the structure 28 is formed of a plurality of hemispherical hobs 30. However, other suitable elevations or structural patterns are possible such as rib-, wave- or pyramid-shaped elevations and the like.

The surface 26 of the heating modules 22 exposed to the solar irradiation is coloured black to increase the efficiency of the heating modules 22. The heating modules 22 according to the invention are preferably manufactured from a suitable plastic. In general, however, other materials can also be used.

The mode of operation of the automatic solar heating system according to the invention is now described.

During bathing operation, the basin 2 of the open-air swimming pool is filled practically to the basin edge with bathing water so that the inlet of the basin boundary 4 formed by the heating modules 22 is located beneath the level of the bathing water. In order to put the solar heating system into operation, the pump-filter unit 16 is briefly switched on. This results in a lower pressure in the warm water tank 10 in comparison to the ambient atmospheric pressure of the basin 2. The ventilation valve 34 of the ventilation means 32 of the warm water tank 10 closes and a continuation of the pumping process by means of the pump-filter unit 16 leads to further reduction in the pressure within the water tank 10. In this manner, a suction effect is also created in the heating modules 22 connected to the warm water tank 10 so that bathing water from the basin 2 flows via the inlet 6 into the heating modules 22. The bathing water flows further through the meander-shaped circulation paths 20 of the individual heating modules 22, leaves the heating modules 22 through the outlet 8 at the end of the entire circulation path of the basin boundary 4 formed by the total number of heating modules 22 and flows via the line 40 and the inlet 12 into the warm water tank 10. The bathing water passes through the level difference H between the outlet 8 of the last heating module 22 of the basin boundary 4 and the inlet 12 of the warm water tank 10. The pump-filter unit 12 can then be switched off since the described process is automatically maintained according to the principle of a suction lifter. When the pump-filter unit 16 is switched off, the ventilation valve 34 of the ventilation means 32 opens again so that the bathing water can flow freely into the warm water tank 10. Simultaneously, the return valve 36 at the outlet 14 of the warm water tank 10 closes so that no return flow of bathing water out of the pump-filter unit 16 or the line 42 into the warm water tank 10 can take place.

The bathing water heats up between entry into the inlet 6 of a first heating module 22 of the basin boundary 4 and its exit through the outlet 8 of the last heating module of the basin boundary 4 and while flowing through the respective circulation paths 20 of the heating modules 22 as a result of solar irradiation. In this manner, heated bathing water enters the warm water tank 10. At an appropriate filling level of the warm water tank 10, the pump-filter unit is newly actuated and the warm water flows out of the warm water tank 10 via the line 42 to the pump-filter unit 16 and subsequently via the line 46 and the basin inlet opening 18 into the basin 2. The capacity of the warm water tank 10 should be rated so that an emptying of the warm water tank 10 takes place preferably in one normal cycle of the pump-filter unit 16 which is necessary for the circulation and cleaning requirements of the bathing water. It is clear from the previously described mode of operation of the solar heating system according to the invention that the circulation of flow through the heating modules 22 is automatically maintained following a single activation by means of the pump-filter unit 16 and that no further energy costs need to be expended other than those which are necessary in any case for the operation of the pump-filter unit 16 for the continuously necessary circulation and cleaning purposes.

It was not revealed in the above description of the mode of operation of the automatic solar heating system according to the invention that upon actuation of the pump-filter unit 16, bathing water is naturally simultaneously supplied via the basin outlet 38 and the line 44 to the pump-filter unit 16. Heated bathing water from the warm water tank 10 is then mixed in the line 46 adjoining the pump-filter unit 16 with cooler bathing water from the line 44. However, the pump-filter unit 16 can optionally be designed so that the line 44 is closed for removing heated bathing water from the warm water tank 10.

The automatic solar heating system according to the invention is not limited to the previously described preferred embodiment. Within the scope of the invention, for example, the basin boundary 4 or the heating modules 22 can be designed in such a manner that they are inclined towards the basin edge so that water splashed out of the basin 2 can flow back into the basin. The warm water tank 10 can also be an integral part of the basin body of the basin 2. The side of such a warm water tank 10 facing the basin interior of the basin 2 can then designed such that a stairway or other desirable shape is simultaneously formed which must otherwise be installed as a separate structural part.

What is claimed is:

1. An automatic solar heating system for an open-air swimming pool which includes a basin for holding bathing water at a water level, the basin having a basin inlet and a basin outlet, the solar heating system comprising:

a solar heating unit including a basin boundary, the basin boundary including a heater inlet, a heater outlet and a circulation path, the heater inlet being disposed below the water level, the basin boundary being constructed and arranged to receive solar irradiation to heat the bathing water that flows through the circulation path between the heater inlet and the heater outlet, the bathing water at the heater outlet being heated bathing water, the basin boundary also including an upper surface adapted to be walked thereon;

a warm water tank adapted to hold the heated bathing water, the warm water tank including a tank inlet and a tank outlet, the tank inlet being disposed at a level below the heater outlet, the tank inlet being fluidly coupled to the heater outlet; and a pump-filter unit fluidly coupled to the tank outlet and the basin inlet;

wherein the basin boundary and the warm water tank are constructed and arranged to siphon the bathing water from the basin into the warm water tank through the circulation path.

2. The solar heating system according to claim 1, wherein the circulation path is meander-shaped.

3. The solar heating system according to claims 1 or 2, wherein the basin boundary includes a plurality of connectable heating modules.

4. The solar heating system according to claim 3, wherein each of the heating modules includes connecting means for connecting the plurality of heating modules to form the circulation path.

5. The solar heating system according to claim 3, wherein the heating modules are substantially plate-shaped.

6. The solar heating system according to claim 1, wherein the upper surface of the basin boundary is adapted to be exposed to the solar irradiation, the upper surface having a perimeter and an upper surface area within the perimeter, the upper surface being constructed and arranged so that the upper surface area is greater than a surface area of a corresponding planar surface within the perimeter.

7. The solar heating system according to claim 6, wherein the basin boundary includes at least one of a plurality of hemispherical nobs and a plurality of ribs disposed on the upper surface to enlarge the upper surface area.

8. The solar heating system according to claim 1, wherein the upper surface of the basin boundary is adapted to be exposed to the solar irradiation, the upper surface being coloured black.

9. The solar heating system according to claim 1, wherein the basin boundary is made from a plastic material.

10. The solar heating system according to claim 1, wherein the basin includes a basin edge, the basin boundary being inclined towards the basin edge.

11. The solar heating system according to claim 1, wherein the warm water tank is constructed and arranged to be separate from the basin.

12. The solar heating system according to claim 1, wherein the warm water tank is constructed and arranged to be an integral part of the basin.

13. The solar heating system according to claim 1, wherein the warm water tank includes ventilation means for ventilating the warm water tank to atmospheric pressure.

14. The solar heating system according to claim 13, wherein the ventilation means includes a ventilation valve connected to the warm water tank, the ventilation valve being adapted to open and close in response to a pressure within the warm water tank.

15. The solar heating system according to claim 1, further comprising a return valve coupled between the tank outlet and the pump-filter unit.

16. The solar heating system according to claim 1, wherein the warm water tank is heat-insulated.

17. The solar heating system according to claim 1, wherein the warm water tank is constructed and arranged to be evacuated to have a tank pressure less than atmospheric pressure of the basin to initiate the bathing water being siphoned from the basin into the warm water tank.

18. The solar heating system according to claim 1, wherein the basin outlet is fluidly coupled to the pump-filter unit independent of the warm water tank.

19. The solar heating system according to claim 1, wherein at least a portion of the circulation path is disposed at a level above the water level.

\* \* \* \* \*